Nov. 14, 1961  J. H. WOODWORTH  3,009,131
ACOUSTIC LOGGING TRANSDUCER
Filed March 6, 1958  2 Sheets-Sheet 1
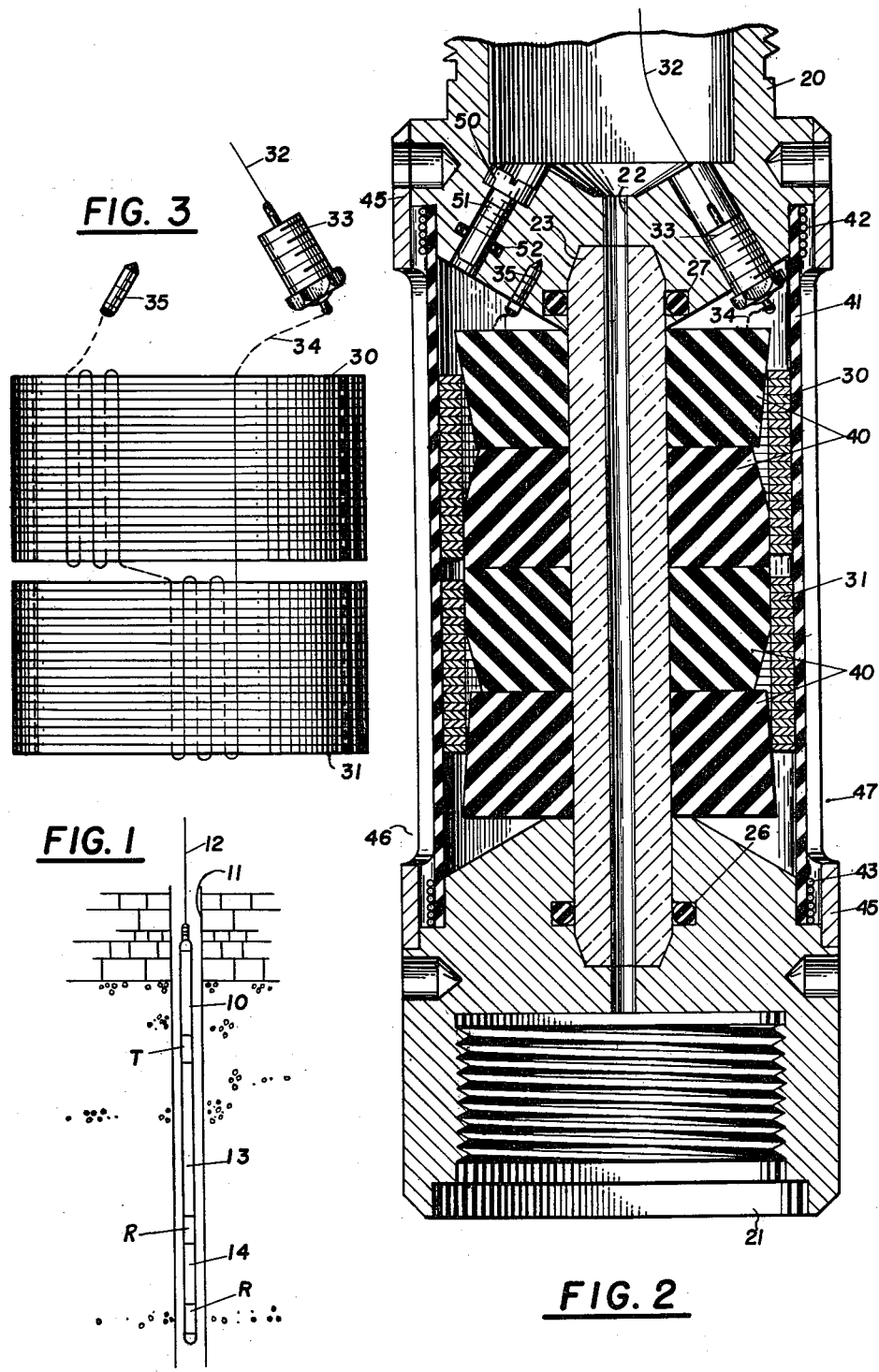

Nov. 14, 1961 J. H. WOODWORTH 3,009,131
ACOUSTIC LOGGING TRANSDUCER
Filed March 6, 1958 2 Sheets-Sheet 2

United States Patent Office 3,009,131
Patented Nov. 14, 1961

3,009,131
ACOUSTIC LOGGING TRANSDUCER
John H. Woodworth, Dallas, Tex., assignor to Socony Mobil Oil Company, Inc., New York, N.Y., a corporation of New York
Filed Mar. 6, 1958, Ser. No. 719,535
7 Claims. (Cl. 340—17)

This invention relates to transducers for generating and/or receiving acoustic waves in a sound transmitting medium.

In connection with geophysical exploration by means of acoustic waves, conditions are encountered which place exacting requirements on the transducers employed in order that data obtained may be of greatest value in understanding the character of the formations under study. In acoustic velocity well logging, for example, high energy acoustic pulses having an abrupt onset must be produced as an exploring unit is moved along the length of a well bore. The resultant acoustic waves are detected, there being generated an electrical signal which faithfully represents the received acoustic wave both in time and amplitude. The provision of a suitable acoustic transducer for generating the acoustic waves as well as detecting the same becomes particularly difficult when it is appreciated that operations are undertaken under conditions encountered in bore-holes at depths of 15,000 to 20,000 feet or more. Such an environment generally is characterized by extremely high pressures and often substantially elevated temperatures. Prior art generators of acoustic waves have included mechanical devices bearing semblance in structure to a doorbell, the breakdown insulation between a pair of spaced electrodes to which a high potential is applied, piezo-electric devices in the form of cylinders and slabs as well as magnetostrictive materials. Detectors generally have been of the form of piezo-electric units.

The present invention is directed to the provision of an acoustic transducer suitable for use in a well bore as a component of a well logging system. The invention comprehends the support of an active element cylindrical in form, suitably coupled to a liquid environment, and mounted by means adapted to withstand high pressures and temperatures encountered in the environment in which the system is to operate.

In a more specific aspect of the invention, there is provided an active element of tubular configuration with circuit means leading to the active element. A non-magnetic, non-conductive mandrel extends axially through the active element. End members are provided and are adapted to receive the ends of the mandrel in an abutting fluid-tight relation to fix the minimum spacing between the end members. A liquid-filled resilient tube is anchored at the ends thereof in liquid-tight fashion to the end members to inundate the active element and the mandrel and to provide acoustic coupling to the exterior environment. A rigid cylinder is secured at the ends thereof to the end members encompassing the resilient sheath and is provided with substantial perforations therein to permit transmission of pressure waves therethrough.

In a more specific aspect, the invention relates to the mounting of a magnetostrictive cylinder either in the form of a scroll or a stack of laminations and windings disposed thereon in a relation such that it is acoustically coupled to a surrounding environment and at the same time adequately protected for travel through a well bore.

For a more complete understanding of the present invention and for further objects and advantages thereof, reference may now be had to the following description taken in conjunction with the accompanying drawings in which:

FIG. 1 diagrammatically illustrates a well logging system;

FIG. 2 is a sectional view of a transducer particularly adapted for generation of acoustic pulses;

FIG. 3 is a detached view of the active elements of the system of FIG. 2 together with a diagrammatic representation of the windings thereon;

Figure 4:
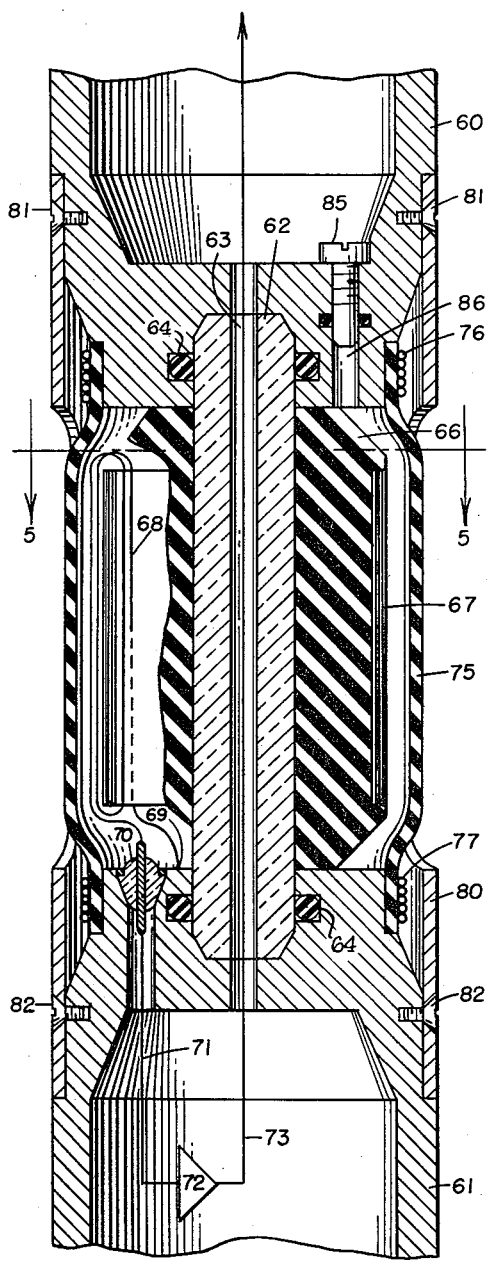
FIG. 4 is a longtiudinal sectional view of a receiving transducer.

Referring now to FIG. 1, there is illustrated an acoustic logging instrument 10 disposed in a borehole 11. The unit 10 is an elongated cylinder supported by cable 12 which extends to the earth's surface and in general will include a support member and conductors forming signal channels which lead to surface instrumentation. As a part of the unit 10, a transmitting transducer T is supported from an upper section and in turn supports an acoustic insulator 13 to which there is attached detecting means including a pair of receiving transducers R suitably insulated one from the other by an insulating section 14. As well understood, the unit 10 is moved along the length of the borehole. Acoustic pulses are periodically generated by transmitter T for travel to adjacent formations and thence through the formations adjacent the wall of the borehole to the receivers R. Siganls from the two receivers R are then transmitted to the earth's surface where desired measurements are made. Such measurements may include a measurement of the time required for the acoustic pulse to travel from the transmitter T to either or both of the receivers R or the time interval between the appearance of the acoustic pulse at the receivers. Alternatively, measurements may be made of the amplitude or frequency or other characteristics of the signal output from the receivers R.

In accordance with the present invention, suitable transducers are provided for the transmitter T and receivers R shown respectively in FIGS. 2 and 4. In each case the structure is characterized by the provision of a supporting structure for an active element which is of such a nature that operations may readily be undertaken in the environments encountered at great depths in a borehole faithfully to generate or detect acoustic waves.

In FIG. 2 there is illustrated a sectional view of a transmitter T. The transmitter T is adapted to be coupled to adjacent sections of unit 10 of FIG. 1 as by the upper threaded end member 20 and the lower threaded end member 21. End members 20 and 21 are provided with a central channel 22 which extends axially of the end members through which suitable electrical circuit cables may be passed from the upper section of unit 10, FIG. 1, to the lower section thereof.

Channel 22 is re-entrant in form in both of the end members 20 and 21 at the face thereof opposite the threaded coupling and is adapted to receive a cylindrical mandrel 23. Mandrel 23 is tubular in form to provide a continuation of the channel 22. Mandrel 23 additionally is so fitted in the end members 20 and 21 to oppose axially directed forces which tend to compress or shorten the borehole unit. Mandrel 23 serves to maintain end members 20 and 21 a predetermined minimum distance apart, the mandrel having a high compressional strength and of characteristics otherwise hereinafter specified. Mandrel 23 is thus fitted in end members 20 and 21 in an abutting relation and sealed by means of O-rings 26 and 27 in a fluid-tight relationship.

In the transmitting transducer of FIG. 2 the active element, the means for generating acoustic pulses, is represented by two stacks 30 and 31 of magnetostrictive washers which form a pair of relatively thick-walled magnetostrictive cylinders. The cylinders 30 and 31, as best shown in FIG. 3, are provided with a common electrical energizing circuit. More particularly as shown in FIG. 2, conductor 32 extends to a liquid-tight, pressure-resistant, insulated feed through terminal 33. As best shown in FIG. 3, a conductor 34 forms a winding on the lower cylinder 31 and then is wound in an opposite sense or direction on cylinder 30 and is terminated at a ground point 35. Upon excitation of the windings on cylinders 30 and 31, either contraction or expansion of the cylinders is produced to generate an acoustic wave whose characteristics depend upon the nature of the electrical signal applied to the windings and the electromechanical characteristics of the cylinders. In any event disposition of the windings in opposite senses around the magnetostrictive cylinders will tend to cancel the magnetic field produced by the two cylinders as measured at a point at the common axis thereof. Operation of the unit is thereby permitted in which any circuit conductors extend through port 22 of FIG. 2 is in a substantially field-free zone. The latter features are described and claimed in co-pending application Serial No. 402,798, filed January 7, 1954, by a co-worker of applicant. The co-pending application is now U.S. Patent No. 2,834,421, issued May 13, 1958.

In accordance with the present invention, cylinders 30 and 31, which for the purpose of simplicity have been shown without windings thereon in FIG. 2, are supported in a coaxial relation by mandrel 23, suitable rubber disks 40 being provided to wedge cylinders 30 and 31 in the desired position. Disks 40 are fitted to mandrel 23 and, in the embodiment illustrated, bear against end members 20 and 21.

A resilient sheath 41 of cylindrical form is secured as by clamping means 42 and 43 to end members 20 and 21, respectively, to provide a fluid-tight enclosure encompassing cylinders 30 and 31. A rigid cylinder 45 is adapted to receive end members 20 and 21 and provides an exterior protective coupling therebetween and serves to sustain any tensile forces applied to the unit. The outer cylinder 45 may be secured as by welding or by suitable screws, not shown, to end members 20 and 21. Cylinder 45 additionally is provided with ports, two of which, ports 46 and 47, are indicated at the sides of FIG. 2 whereby acoustic waves may be transmitted from the active element housed therein.

End member 20 is provided with a port 50 which threadedly receives screw 51. The port 50 is employed, after the unit has been completely assembled, for the injection of a suitable coupling liquid such as castor oil which completely fills the spaces on the interior of the resilient sheath 41. Once filled, screw 51 is set with a fluid-tight seal being provided by O-ring 52. As thus completed, the transmitting transducer may be secured to and become a part of the borehole unit 10 of FIG. 1 and upon suitable excitation by the application of power pulses to conductor 32 will serve to generate acoustic waves of a desired nature.

It will be appreciated that the provision of mandrel 23 forms a significant part of the present invention. The importance of this element will best be appreciated when it is understood that the active elements 30 and 31 may be considered to be the core of a transformer with the circuit 34 comprising a primary winding thereon. Any circuit coupled in the form of a winding to the transformer core will have voltages induced therein dependent upon the nature of such circuit and of the excitation of the primary winding. Prior art systems have employed a unit for coupling end members 20 and 21 together which has been metallic in nature thereby providing the basis for a short-circuited secondary loop coupled to the core. In the present invention mandrel 23 is formed of a ceramic material thereby providing a non-conductive segment in what otherwise would be a short-circuited winding around the active elements 30 and 31. More particularly, except for mandrel 23, such winding would comprise end member 20, cylinder 45 and end member 21.

In one embodiment of the invention mandrel 23 was a tube of alumina ceramic material and more particularly comprised 96% $Al_2O_3$. The tube was about ¾" in diameter and 5" in length. While such a mandrel has a relatively low tensile strength, specified at about 25,000 p.s.i., it had a comprehensive strength of about 400,000 p.s.i. Units of such material are available from American Lava Corporation of Chattanooga, Tennessee, under the trade name "AlSiMag 614."

For operation in a well bore of high hydrostatic heads, substantial pressures are developed tending to compress the unit and force end members 20 and 21 closer together. Mandrel 23, suitably fitted into end members 20 and 21 in the abutting relationship illustrated in FIG. 2, opposes any compressive forces applied to the unit to maintain end members a predetermined minimum distance apart and prevents current flow in the mounting structure which extends through the active element. It will be noted that mandrel 23 is mounted in end members 20 and 21 to resist compressive forces only. The outer cylinder 45 is adapted to withstand the tensile forces applied to the transducer. The latter forces in general will not be unduly great, the primary problem being due to the high compressive stress.

From the foregoing description, the construction of a suitable transmitting transducer will now be appreciated. It should be understood, however, that the device thus illustrated and described is suitable for operation with active elements other than magnetostrictive units. For example, piezo-electric cylinders, one or more, may be mounted similar to the mounting of magnetostrictive elements 30 and 31 which upon suitable energization may be employed for the generation of acoustic signals.

Figure 5:
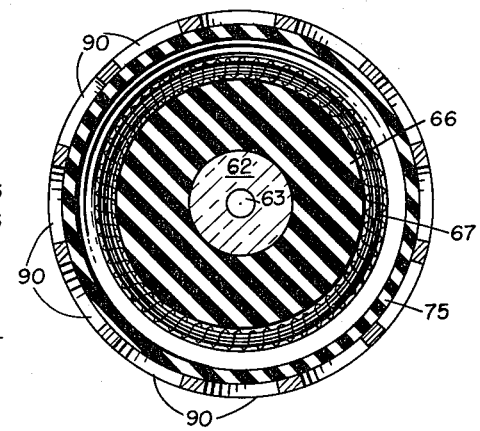
FIG. 5 is a cross section of the system of FIG. 4 taken along the lines 5—5.

In FIGS. 4 and 5 the invention is illustrated in the form of a system that has been found particularly suitable for use as an acoustic detector. In the system of FIG. 4, end members 60 and 61 are supported in a predetermined spaced relation with a mandrel 62 which is provided with a central opening 63 through which circuits may extend. Suitable liquid-sealing means such as O-rings 64 are provided to maintain a liquid-tight relationship between end members 60 and 61 and mandrel 62. A rubber spool 66 is mounted on mandrel 62 and supports a scroll 67 of magnetostrictive material. Scroll 67 in one embodiment of the invention comprised a cylinder 2⅛" outside diameter and 1⅞" inside diameter and 2½" in length. It was formed from a long strip of a magnetostrictive material known in the art as 2V-Permendur which is an alloy comprised of nickel and 2% vanadium. The strip had a thickness of 0.010".

Scroll 67 suitably supported by spool 66 formed the active element of the receiving transducer of FIGS. 4 and 5. A toroidal winding represented by the winding 68 is disposed around the magnetostrictive scroll 67. In the above-mentioned embodiment of the invention, winding 68 comprised 450 turns of closely wound No. 28 enamel insulated copper wire.

One terminal of winding 68 is connected to a ground point 69. The other terminal is connected to a pressure resistant feed through terminal 70. A circuit 71 extends from terminal 70 to an amplifier 72. The output of amplifier 72 is applied to a channel 73 which extends upward through aperture 63 to instrumentation such as located in an upper section of unit 10 of FIG. 1. A resilient cylinder 75 is secured at the ends thereof by clamping means 76 and 77 to end members 60 and 61, respectively. An outer metallic cylinder 80 is secured as by screws 81 to end member 60 and by screws 82 to end member 61 to provide tensile strength for the unit. A cap screw 85 is removable from a threaded opening 86 to permit introduction of suitable coupling fluid into the voids inside resilient member 75. As best shown in FIG. 5, a plurality of elongated slots or apertures 90 are provided in the outer cylinder 80 so that acoustic waves traveling to the receiving transducer of FIGS. 4 and 5 may pass readily to resilient sheath 75 and through the liquid inside sheath 75 to the active element 67. In this case, as above discussed in connection with FIG. 2, the provision of a mandrel capable of resisting high compressive forces and of non-magnetic electrically insulating properties provides a detecting system permitting operation with a minimum of extraneous noise or other effects which would be coupled to the magnetic scroll 57 if a magnetic or conductive central unit were employed for coupling end members 60 and 61 together.

A magnetostrictive type detector such as shown in FIGS. 4 and 5 has been found particularly desirable in that signals of substantial amplitude, of the order of those obtainable from high impedance piezo-electric detectors, are available at relatively low impedance. In the embodiment above described, the impedance was of the order of about 4,000 ohms at the frequencies of interest, the latter being of the order of 10 to 20 kilocycles.

While the invention has been described in connection with certain specific embodiments thereof, it will now be understood that further modifications will suggest themselves to those skilled in the art and it is intended to cover such modifications as fall within the scope of the appended claims.

What is claimed is:

1. A transducer for pressure waves in a liquid environment comprising an active element of tubular configuration, circuit means leading to said active element, a non-magnetic, non-conductive mandrel extending centrally through said active element, end members adapted to receive the ends of said mandrel in an abutting fluid-tight relation thereby to determine a minimum spacing between said end members, a liquid-filled resilient tube anchored at the ends thereof in liquid-tight fashion to said end members and encompassing said element and said mandrel, and a rigid cylinder secured at the ends thereof to said end members and encompassing said tube with perforations therein to permit transmission of pressure waves therethrough.

2. A transducer for pressure waves in a liquid environment comprising an active element of tubular configuration, circuit means leading to said active element, a non-magnetic ceramic mandrel extending through said active element and adapted to support said element, end members adapted to receive the ends of said mandrel in an abutting fluid-tight relation thereby to determine a minimum spacing between said end members, a liquid-filled resilient tube anchored at the ends thereof in liquid-tight fashion to said end members and encompassing said element and said mandrel, and a rigid metallic cylinder secured at the ends thereof to said end members to prevent any separation of said end members substantially greater than said minimum spacing, said rigid cylinder encompassing said tube and having perforations therein to permit transmission of pressure waves therethrough.

3. Transducer means for pressure waves in a liquid environment comprising a magnetostrictive cylinder, a toroidal winding supported on said cylinder, a non-magnetic, non-conductive mandrel extending through said toroidal winding and said cylinder, end members adapted to receive the ends of said mandrel in fluid-tight relation, a resilient liquid-filled sheath cylindrical in form extending between said end members and encompassing said cylinder and said mandrel, and a rigid perforated cylinder extending between said end members and encompassing said sheath and adapted to permit transmission of pressure waves therethrough.

4. A transducer for generating pressure waves in a liquid medium which comprises a magnetostrictive cylinder, windings encircling said cylinder to form a magnetostrictive toroid, a ceramic mandrel extending axially of said cylinder and adapted to support said cylinder concentrically thereon, end members adapted to receive the ends of said mandrel in fluid-tight relation, a resilient sheath cylindrical in form extending between and coupled to said end members to form a fluid-tight zone in the region of said cylinder, liquid coupling means disposed within said resilient sheath for transmitting sound waves from said cylinder, and a rigid external jacket cylindrical in form secured at the ends thereof to said end members and having a plurality of ports therein for passage therethrough of acoustic waves produced on excitation of said windings.

5. A transducer for detecting pressure waves in a liquid medium which comprises a magnetostrictive cylinder, a plurality of windings encompassing said cylinder to form a magnetostrictive toroid, a ceramic mandrel extending axially of said cylinder and adapted to support said cylinder therefrom in coaxial relationship, end members adapted to receive the ends of said mandrel in fluid-tight relation, and a resilient cylindrical sheath connected at the ends thereof to the exterior of said end members and filled with a transmitting liquid and a rigid external cylindrical tube extending between and secured to said end members and provided with a plurality of ports for transmission therethrough of acoustic energy from said liquid medium to said transducer.

6. An acoustic transducer for operation in a liquid medium which comprises a magnetostrictive cylinder, a toroidal winding encompassing said cylinder, a pair of end members, one spaced coaxially from each end of said cylinder and each having a re-entrant axial channel extending from the face thereof adjacent said cylinder, a hollow ceramic mandrel extending axially of said cylinder and fitted in an abutting relation in the re-entrant channels in said end members to maintain said end members a predetermined distance apart, resilient spool means mounted on said mandrel for supporting said cylinder coaxially therewith, a resilient cylindrical sheath coupled at the ends thereof to an exterior surface of said end members to form an enclosure for said cylinder, and a rigid metallic tube encompassing said resilient cylindrical sheath and rigidly secured to an exterior surface of said end members to determine the maximum distance between said end members, said tube being provided with radial ports for transmission of acoustic energy therethrough.

7. An acoustic transducer for operation in a liquid medium which comprises a magnetostrictive cylindrical scroll, a toroidal winding encompassing said scroll, a pair of end members, one spaced coaxially from each end of said scroll and each having a re-entrant axial channel extending from the face thereof adjacent said scroll, a ceramic mandrel extending axially of said scroll and fitted in an abutting relation in the re-entrant channels in said end members to maintain said end members a predetermined distance apart, resilient spool means mounted on said mandrel for supporting said scroll coaxially therewith, a resilient cylindrical sheath coupled in fluid-tight relation at the ends thereof to an exterior surface of said end members to form an enclosure for said scroll, and a rigid metallic tube encompassing said resilient cylindrical sheath and rigidly secured to an exterior surface of said end members to determine the maximum distance between said end members, said tube being provided with radial ports for transmission of acoustic energy therethrough.

References Cited in the file of this patent

UNITED STATES PATENTS

| | | |
|---|---|---|
| 2,411,696 | Silverman | Nov. 26, 1946 |
| 2,431,026 | Bundy | Nov. 18, 1947 |
| 2,708,742 | Harris | May 17, 1955 |
| 2,732,536 | Miller | Jan. 24, 1956 |
| 2,737,639 | Summers | Mar. 6, 1956 |
| 2,762,032 | Vogel | Sept. 4, 1956 |
| 2,790,964 | Schurman | Apr. 30, 1957 |
| 2,848,710 | Owen | Aug. 19, 1958 |